United States Patent [19]

Pyzik et al.

[11] Patent Number: 5,135,545
[45] Date of Patent: Aug. 4, 1992

[54] METHOD FOR MAKING MACHINABLE ABRASIVE GREENWARE

[75] Inventors: Aleksander J. Pyzik, Midland; Jack J. Ott, Hemlock, both of Mich.

[73] Assignee: The Dow Chemical Company, Midland, Mich.

[21] Appl. No.: 673,622

[22] Filed: Mar. 22, 1991

[51] Int. Cl.$^5$ .............................. B24D 3/00
[52] U.S. Cl. ........................ 51/293; 51/298; 264/128; 524/430; 524/612
[58] Field of Search ........... 51/293, 298; 524/430, 524/612; 264/128

[56] References Cited

U.S. PATENT DOCUMENTS

| | | | |
|---|---|---|---|
| 2,309,463 | 1/1943 | Lombard et al. | 51/293 |
| 2,312,392 | 3/1943 | Daniels | 51/298 |
| 2,361,784 | 10/1944 | Melton et al. | 51/293 |
| 2,423,293 | 7/1947 | Ciell | 51/293 |
| 4,662,897 | 5/1987 | Atikinson et al. | 51/293 |
| 4,830,994 | 5/1989 | Schuetz | 501/127 |
| 4,867,759 | 9/1989 | Tiefenbach, Jr. et al. | 51/298 |

Primary Examiner—William R. Dixon, Jr.
Assistant Examiner—Willie J. Thompson

[57] ABSTRACT

The present invention employs poly(ethyloxazoline) as a temporary binder and lubricant during the preparation of greenware articles. According to the present invention, molten poly(ethyloxazoline) promotes the compressibility of the powder used to form the greenware article, thus improving the density and strength of both the greenware and the abrasive article. The molten poly(ethyloxazoline) acts as a lubricant to permit a more efficient grain rearrangement under applied pressure and thereby increases the average density of the greenware article by 6 to 8 percent as compared to standard cold pressing.

17 Claims, No Drawings

METHOD FOR MAKING MACHINABLE ABRASIVE GREENWARE

TECHNICAL FIELD

The present invention generally relates to ceramic greenware which can be fired to form abrasive articles. More specifically, this invention relates to a method of forming ceramic greenware which improves compressibility and density of the ceramic greenware, thereby producing a denser abrasive article with sufficient strength to withstand machining.

BACKGROUND OF THE INVENTION

Abrasive articles are extensively used in numerous fabrication and dressing operations, such as abrasive machining and finishing. Depending on the intended use, abrasive articles can be formed either as an abrasive dispersed in a binder or resin matrix to form a bonded solid shape, or as an abrasive which is bonded to a suitable substrate such as metal or paper. Of interest here is the former category, which includes sharpening stones, honing stones, grinding wheels and the like. This form of abrasive article is particularly suited for rough and precision grinding.

Abrasive articles are produced by firing a greenware article having the shape of the desired final product. Generally, the greenware article is made by combining abrasive particles, a temporary binder and a permanent binder in a carrier medium which is capable of suitably suspending, dispersing and wetting the abrasive particles within the abrasive mixture. The permanent binder holds the abrasive particles together after firing when the abrasive article is in its finished form. The type of permanent binder used can be organic or inorganic, depending upon the properties desired.

The temporary binder is necessary to provide the greenware with sufficient strength for retaining its shape during handling and processing prior to its firing. Dextrin is commonly used as the temporary binder. However, poly(ethyloxazoline) has been shown to have advantageous characteristics over dextrin, as reported in U.S. Pat. No. 4,830,994 to Schuetz and U.S. Pat. No. 4,867,759 to Tiefenbach, Jr. et al, both of which are assigned to the assignee of the present invention. Both Schuetz and Tiefenbach, Jr. et al teach that the greenware article is formed at room temperature wherein the poly(ethyloxazoline) is a solid and acts to bind the abrasive grit.

After combining the ingredients, the abrasive mixture often undergoes processing, such as ball milling, to reduce the particle size of the abrasive particles and to further distribute the ingredients. The abrasive mixture is then dried by any conventional means, such as spray or pan drying, to form a substantially dry powder. The powder can then be formed into a greenware article using such well known methods as dry pressing, isostatic pressing, extrusion or slip casting. This step is of particular importance because the compression of the greenware article that occurs here substantially determines the density, porosity and strength of the final abrasive article produced.

Because density and strength are desirable characteristics in both the greenware and the abrasive article, additional ingredients, such as dispersants, plasticizers and lubricants, are often added to the abrasive mixture. Dispersants improve the solids to liquid ratio of the abrasive mixture and facilitate ball milling, plasticizers improve toughness and flexibility of the binder, while lubricants help to minimize particle-to-particle friction during pressing of the greenware article, thus promoting compressibility.

Following the forming step, the greenware article is then heated to remove or burn out the temporary binder. The required temperature for removing the temporary binder is dependent upon the type used. Details as to burn out time, temperature and pressure corresponding to a particular binder are readily ascertainable by those skilled in the art.

To further improve density and strength of the final abrasive article, the fired abrasive article may undergo further processing, such as hot pressing, hot isostatic pressing, sintering, hot isostatic forging, and the like. It is often necessary to machine, grind, cut or drill the final abrasive article to precisely achieve the desired form. This final step in processing is generally deferred until after firing because the greenware article is not sufficiently strong enough to withstand the rigors of such processing.

It can be readily appreciated that to reduce processing time and costs it is desirable to minimize the use of additional ingredients and post-firing pressing for purposes of producing a more dense abrasive article In addition, abrasive articles are difficult and expensive to machine, particularly after sintering, hot pressing, and hot isostatic pressing.

Accordingly, what is needed is a process for forming greenware articles which improves the compressibility of the abrasive mixture used in making the greenware article such that the density and strength of both the greenware article and the abrasive article are increased.

SUMMARY OF THE INVENTION

The present invention employs poly(ethyloxazoline) as not only the temporary binder in the preparation of greenware articles, but also as a liquid lubricant during the subsequent forming of the greenware article. It has been determined that when heated sufficiently to become liquid, poly(ethyloxazoline) promotes the compressibility during pressing of the powder used to form the greenware article, thus improving the density and strength of both the greenware and the abrasive article.

According to a preferred aspect of this invention, improved compressibility is achieved because molten poly(ethyloxazoline) is capable of wetting the surface of the abrasive grit at temperatures greater than about 95° C. As a result, the poly(ethyloxazoline) is able to act as a lubricant to permit a more efficient grain rearrangement under applied pressure. The corresponding increase in the average density of the article is approximately 6 to 8 percent as compared to standard cold pressing procedures. In addition, poly(ethyloxazoline) in the presence of ethanol acts as a surfactant to help obtain good dispersion of the abrasive grit within the abrasive mixture.

Another significant advantage of the present invention is that after polymer solidification occurs, a strong bond is formed which allows for machining and handling of greenware article. This effect is particularly advantageous because abrasive articles are difficult and expensive to machine after thermal treatment such as sintering, hot pressing, and hot isostatic pressing. Because the process according to the present invention results in a very dense and strong greenware article, the greenware article can be easily ground, cut or drilled prior to firing or any subsequent thermal treatment.

Accordingly, it is an object of the present invention to provide an improved process for forming greenware articles which is capable of improving compressibility of the greenware article during forming.

It is a further object of this invention that such a process improve the density and strength of the greenware article, thereby producing a corresponding increase in the density and strength of the final abrasive article produced.

It is still a further object of this invention that the added strength provided by such a process allow the greenware article to be machined, ground, cut or drilled as desired to more closely form the final shape of the abrasive article.

It is yet another object of this invention that such a process reduce the need for post-firing processing of the abrasive article.

It is still another object of this invention that such a process reduce the need for additional ingredients which are intended to improve compressibility of the greenware article.

Other objects and advantages of this invention will be more apparent after a reading of the following detailed description taken in conjunction with the illustrative examples provided.

DETAILED DESCRIPTION OF THE INVENTION

The process of the present invention employs poly(ethyloxazoline) as a temporary binder and liquid lubricant in the making of greenware articles which are fired to form abrasive articles. In particular, it has been found that poly(ethyloxazoline) at temperatures above about 95° C. acts as a lubricant for the abrasive grit of a greenware article by wetting the abrasive grit's surface. This lubricous action promotes more efficient grain rearrangement when the abrasive grit is under applied pressure during the forming of the greenware article. As a result, the density and strength of the greenware article formed is substantially increased.

Poly(ethyloxazoline) is a commercially available polymer. It is well known in the art that poly(ethyloxazoline) is hydrolyzed only under severe conditions, e.g. at high temperatures in the presence of very strong acids or bases. Though it is preferable that the poly(ethyloxazoline) be unhydrolyzed, for purposes of the present invention it is possible to employ poly(ethyloxazoline) which has been partially hydrolyzed via methods known in the art. It is also preferable that the poly(ethyloxazoline) used has an average molecular weight ranging from about 10,000 to about 1,000,000 and more preferably from 100,000 to about 600,000.

Poly(ethyloxazoline) reaches its liquidus state at or above the 95° C. temperature referred to above. It is in the liquidus state that poly(ethyloxazoline) is able to act as a lubricant for the abrasive grit. The present invention uses a preferred temperature range of between about 112° C. and about 115° C., ensuring full melting of the poly(ethyloxazoline) while also avoiding burn out. After forming the greenware article, the temperature is allowed to return below the liquidus temperature of the poly(ethyloxazoline).

After polymer solidification occurs at the lower temperatures, the poly(ethyloxazoline) forms a strong bond which imparts strength to the greenware article, allowing for handling and further machining if desired. The poly(ethyloxazoline) is eventually burned out during firing of the greenware article. The quantity of poly(ethyloxazoline) needed to provide the desired strength will generally be between about 0.1 and about 20 percent by weight poly(ethyloxazoline), and preferably between about 0.2 and about 5 percent by weight in relation to the weight of the abrasive grit.

In the preferred embodiment the abrasive grit forms the bulk of the abrasive article to be produced. The abrasive grit material used can be any commonly available ceramic-containing material, such as the boron carbide used in the examples below. Grit sizes, commercially available in sizes ranging between submicron size to in excess of 1 millimeter, may be used as desired or as the intended use of the abrasive article dictates.

The permanent binder used to hold the final abrasive article together can be either an organic binder, such as the phenolic resin used in the examples which follow, or an inorganic binder. The permanent binder is used in amounts which are sufficient to maintain the structural integrity of the final abrasive article. The necessary amounts will vary depending upon the permanent binder used, but will be readily ascertainable by those skilled in the art.

The abrasive grit, the permanent binder and the poly(ethyloxazoline) can be combined using well known methods to form an abrasive mixture. For example, molten poly(ethyloxazoline) can be added to a previously formed mixture of abrasive grit and a permanent binder while stirring or blending until all three ingredients are thoroughly wetted. A more preferred method of mixing the abrasive grit, permanent binder and poly(ethyloxazoline) uses a carrier medium. The carrier medium serves to suspend the abrasive grit, permanent binder, and further serves to disperse the poly(ethyloxazoline) in a manner such that the abrasive grit and permanent binder are thoroughly wetted.

Preferably, the carrier medium is substantially capable of dissolving the poly(ethyloxazoline). Examples of such a preferred carrier medium include ethanol, water, acetone, methanol and other polar organic solvents. Testing has indicated that ethanol is particularly desirable because the ethanol promotes the action of poly(ethyloxazoline) as a surfactant to help obtain good dispersion of the abrasive grit within the abrasive mixture.

As is well known in the art, optional materials such as lubricants, coloring agents, surfactants, dispersants, and fillers can be added to the abrasive mixture. Lubricants such as calcium stearate, zinc stearate, synthetic waxes, stearic acid and the like may be employed in order to reduce the friction between particles during cold pressing. However, it is a specific advantage of the present invention that additional lubricants are not needed because of the lubricous action of the molten poly(ethyloxazoline).

Abrasive mixtures can be formed into a greenware article using such known methods as casting, pressing or extrusion. For purposes of optimizing the lubricous effects of the poly(ethyloxazoline), pressing methods such as dry, semi-dry, or isostatic pressing are preferred. The pressing action benefits from the ability of the poly(ethyloxazoline) to wet the abrasive particles, providing sufficient lubrication to promote more efficient grain rearrangement when the abrasive grit is under applied pressure. As a result, the density and strength of the greenware article formed is substantially increased, having sufficient strength to be handled without breakage or significant deformation. More particularly, the strength of the resulting greenware article will be sufficient for the greenware article to undergo subsequent processing such as machining, grinding, drilling and the like, thus minimizing the need for such processing after firing of the greenware article.

The greenware article is fired using methods which are well known in the art. The purpose of firing is to remove the temporary binder and form the permanent bond between the abrasive grit with the permanent binder. Complete removal of the poly(ethyloxazoline) is desirable so as to avoid forming carbon residue that can later be trapped in the permanent binder, causing bubbles which can lead to bloating, warping, and cracking of the abrasive article.

Poly(ethyloxazoline) will generally decompose rapidly if heated above certain temperatures, such as about 600° F., unless it is brought up to temperature slowly. Rapid decomposition produces large volumes of gas which can crack the greenware. Thus, it is preferred to perform the burn out step at a temperature below about 460° F. for a time sufficient to remove slowly most of these gases before the temperature is increased in the next step of the firing sequence.

The fired abrasive article typically is very porous. Abrasive articles can be made with varying degrees of porosity and cohesion, as is well known to those skilled in the art. The abrasive article can be further finished to form sharp, well defined edges in view of its improved density and strength. However, as previously noted, an advantage of the present invention is that the greenware article itself is strong enough to withstand the machining, cutting, grinding and drilling which is necessary to produce the necessary dimensional features of the abrasive article.

EXAMPLES

The following examples and comparative experiments are included for illustrative purposes only, and are not intended to limit the scope of the invention. All percentages are by weight unless otherwise indicated.

EXAMPLE 1

An abrasive mixture using poly(ethyl oxazoline) at a solution strength of 2 percent relative to the abrasive grit was made with the following procedure. 200 milliliters of ethanol was placed in a beaker having a magnetic stirrer. 0.3 grams of a suitable surfactant (such as commercially available Triton X100) was then added. Next, three grams of poly(ethyloxazoline) were added and the solution was stirred for approximately one hour. Fifteen grams of a phenolic resin were added next, the solution thereafter being stirred for approximately one half hour.

Finally, 150 grams of boron Carbide abrasive grit were stirred into the solution to form an abrasive mixture. The abrasive mixture appeared to smooth out and act creamy very quickly using this procedure. Stirring of the abrasive mixture was continued until it becomes a very thick slurry. The slurry was then artificially dried for 10 minutes at 115° C., and then left on a pyrex drying dish overnight to form a dry powder.

The powder was heated to a temperature between about 112° and 115° C. Once the poly(ethyloxazoline) entered its liquidus state, the powder was isostatically pressed to form the desired greenware article.

EXAMPLE 2

An abrasive mixture of 2 percent by weight poly(ethyloxazoline) was made by first forming two separate batches of an abrasive mixture with the following procedure. For each batch, 400 milliliters of ethanol was placed in a beaker having a mechanical stirrer. One gram of a suitable surfactant (such as commercially available Triton X100) was then added, and the solution was stirred for approximately one hour. Next, twenty grams of poly(ethyloxazoline) were added and the solution was stirred further for approximately two hours. An additional 200 milliliters of ethanol were then added, and the solution was again stirred for 1 hour. Fifty grams of a phenolic resin were then added and the solution was stirred for approximately two hours.

The two separate batches formed by the above procedure were then combined in a suitably sized container equipped with a mechanical stirrer. Introduction of the boron carbide abrasive grit to the solution was begun while the solution was stirred. After one half hour, an additional 400 milliliters of ethanol was added to the solution, and the addition of the boron carbide was continued until a total of 2000 grams had been added. An additional 1500 milliliters of ethanol was added until the consistency of the abrasive mixture was such that the boron carbide was fully wetted. The abrasive mixture was allowed to set for up to twelve hours, and then stirring was continued for an additional three hours.

The slurry was then artificially dried for 10 minutes at 115° C., and then left to dry further on a pyrex drying dish for overnight drying to form a dry powder. The powder was then heated until its temperature was between about 112° and 115° C. When the poly(ethyloxazoline) entered its liquidus state, the powder was hot pressed to form the desired greenware article.

Results of greenware articles formed using the above procedure in the second Example are provided below. Included are results of a control group which followed a similar procedure but without the temperature of the powder being raised to liquify the poly(ethyloxazoline).

| Abrasive Article Description | Pressing Temp. (°F.) | Pressing Pressure (psi) | Calculated Density (grams/cc) | Percent of Theoretical |
|---|---|---|---|---|
| ¼" cyl. | Room Temp | 1000 | 1.86 | 78% |
| ¼" cyl. | 115 | 1000 | 2.04 | 85 |
| ¼" cyl. | Room Temp | 3000 | 1.68 | 70 |
| ¼" cyl. | 115 | 3000 | 1.86 | 78 |
| ¼" cyl. | Room Temp | 4000 | 1.79 | 75 |
| ¼" cyl. | 115 | 4000 | 1.93 | 81 |
| flat bar | Room Temp | 10,000 | 1.07 | 44 |
| flat bar | 115 | 10,000 | 1.25 | 52 |
| flat bar | 115 | 15,000 | 1.35 | 57 |

The above results demonstrate the unexpectedly improved density of the greenware article produced when the poly(ethyloxazoline) is heated sufficiently to become liquid prior to pressing. A significant advantage of the process described above is that, when using such well known methods as dry pressing, isostatic pressing, extrusion or slip casting, the molten poly(ethyloxazoline) acts as a lubricant within the abrasive mixture, improving compressibility and therefore density of the greenware article by approximately six to eight percent.

In addition, a significant advantage of the present invention is that the improved density corresponds to an improved strength in the greenware, allowing the use of additional grinding, machining, cutting, and drilling of the greenware, minimizing the need for such procedures following firing when such processing is much more difficult and expensive.

While the invention has been described in terms of a preferred embodiment, it is apparent that other forms could be adopted by one skilled in the art. Accordingly, the scope of the invention is to be limited only by the following claims.

What is claimed is:

1. A method for forming a machinable abrasive greenware article, said method comprising the steps of:
   (a) forming a slurry comprising an abrasive grit powder and poly(ethyloxazoline);
   (b) drying said slurry to form a mixture;
   (c) grinding said mixture to form a powder; and
   (d) heating said powder to temperature sufficient to liquify said poly(ethyloxazoline) within said mixture, said temperature being insufficient to vaporize said poly(ethyloxazoline) within said mixture.

2. The method of claim 1, wherein the percentage by weight of said poly(ethyloxazoline) in relation to said abrasive grit is about 2%.

3. The method of claim 1, wherein said heating step occurs at a temperature of greater than about 95° C.

4. The method of claim 1, wherein said heating step occurs at a temperature of about 112° to 115° C.

5. The method of claim 1, further comprising the step of placing said powder in a die prior to said heating step.

6. The method of claim 1, further comprising the step of pressing said powder after or concurrently with said heating step to form a greenware article.

7. The method of claim 6, wherein said pressing is accomplished by dry pressing, or isostatic pressing.

8. A method for forming a machinable boron carbide greenware article, said method comprising the steps of:
   (a) forming a slurry comprising a solvent, a boron carbide powder, a phenolic resin, a surfactant, and poly(ethyloxazoline);
   (b) drying said slurry to form a mixture;
   (c) grinding said mixture to form a fine powder; and
   (d) heating said powder to temperature sufficient to liquify said poly(ethyloxazoline) within said mixture, said temperature being insufficient to vaporize said poly(ethyloxazoline) within said mixture.

9. The method of claim 8, wherein said selected from the group consisting of water, methanol, ethanol, acetone and mixtures thereof.

10. The method of claim 8, wherein said solvent is ethanol.

11. The method of claim 8, wherein the percentage by weight of said poly(ethyloxazoline) in relation to said boron carbide powder is about 2%.

12. The method of claim 8, wherein said heating step occurs at a temperature than about 95° C.

13. The method of claim 8, wherein said heating step occurs at a temperature of a 112° to 115° C.

14. The method of claim 8, further comprising the step of placing said powder in a die prior to said heating step.

15. The method of claim 8, further comprising the step of pressing said after or concurrently with said heating step to a greenware article.

16. The method of claim 1, wherein said pressing is accomplished by dry pressing, or isostatic pressing.

17. A method for forming a machinable boron carbide greenware article, said method the steps of:
   (a) forming a slurry comprising a solvent, a boron carbide powder, a phenolic resin, a surfactant, and poly(ethyloxazoline);
   (b) drying said slurry to for mixture;
   (c) grinding said mixture to a fine powder;
   (d) placing said powder in a die;
   (e) heating said powder to a of about 112° to 115° C.; and
   (f) pressing said powder to of a greenware article.

* * * * *